(12) United States Patent
Kim et al.

(10) Patent No.: US 11,465,563 B2
(45) Date of Patent: Oct. 11, 2022

(54) LUGGAGE BOARD APPARATUS FOR VEHICLE

(71) Applicants: Hyundai Motor Company, Seoul (KR); Kia Motors Corporation, Seoul (KR)

(72) Inventors: Ji Ah Kim, Seoul (KR); Jin Ho Hwang, Chungcheongnam-do (KR); Min Ho Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/995,030

(22) Filed: Aug. 17, 2020

(65) Prior Publication Data

US 2021/0261062 A1    Aug. 26, 2021

(30) Foreign Application Priority Data

Feb. 26, 2020  (KR) .................. 10-2020-0023358

(51) Int. Cl.
*B60R 5/04* (2006.01)
(52) U.S. Cl.
CPC ..................... *B60R 5/04* (2013.01)
(58) Field of Classification Search
CPC ....................................................... B60R 5/04
USPC ....................................................... 296/37.5
See application file for complete search history.

(56) References Cited

U.S. PATENT DOCUMENTS

| 2,014,019 | A | * | 9/1935 | Girl | B60R 5/04 |
| | | | | | 414/522 |
| 5,996,866 | A | * | 12/1999 | Susko | B60R 11/0241 |
| | | | | | 224/281 |
| 6,808,217 | B2 | * | 10/2004 | Nick | B60R 5/04 |
| | | | | | 296/26.08 |
| 7,600,800 | B2 | * | 10/2009 | Suzuki | B60R 5/04 |
| | | | | | 296/37.14 |
| 9,902,338 | B2 | * | 2/2018 | Wirkner | B60R 11/0241 |
| 9,902,339 | B2 | * | 2/2018 | Gilling | B60R 11/02 |
| 10,377,319 | B2 | * | 8/2019 | Muiter | B60R 11/0241 |
| 10,793,081 | B2 | * | 10/2020 | Tena Han | B60R 11/02 |
| 10,793,082 | B2 | * | 10/2020 | Harris | B60R 11/02 |
| 2002/0140245 | A1 | * | 10/2002 | Coleman, II | B60R 5/04 |
| | | | | | 296/26.09 |
| 2003/0234550 | A1 | * | 12/2003 | Brooks | B60R 11/0211 |
| | | | | | 296/24.46 |
| 2010/0090491 | A1 | * | 4/2010 | Hipshier | B60R 7/04 |
| | | | | | 296/24.34 |
| 2018/0162283 | A1 | * | 6/2018 | Ranganathan | B60R 7/043 |

FOREIGN PATENT DOCUMENTS

| GB | 2568709 A | * | 5/2019 | ............... B60R 5/04 |
| KR | 10-2002-0052909 A | | 7/2002 | |

* cited by examiner

*Primary Examiner* — Pinel E Romain
(74) *Attorney, Agent, or Firm* — Fox Rothschild LLP

(57) ABSTRACT

A luggage board apparatus for a vehicle is provided. The apparatus includes a front board and a rear board that are separated to be movable in the front-rear direction of the vehicle within a luggage room. The front board and the rear board are operable simultaneously and individually. A position of a parting line at which the front board and the rear board are in contact with each other may be adjusted to a position desired by a user.

14 Claims, 17 Drawing Sheets

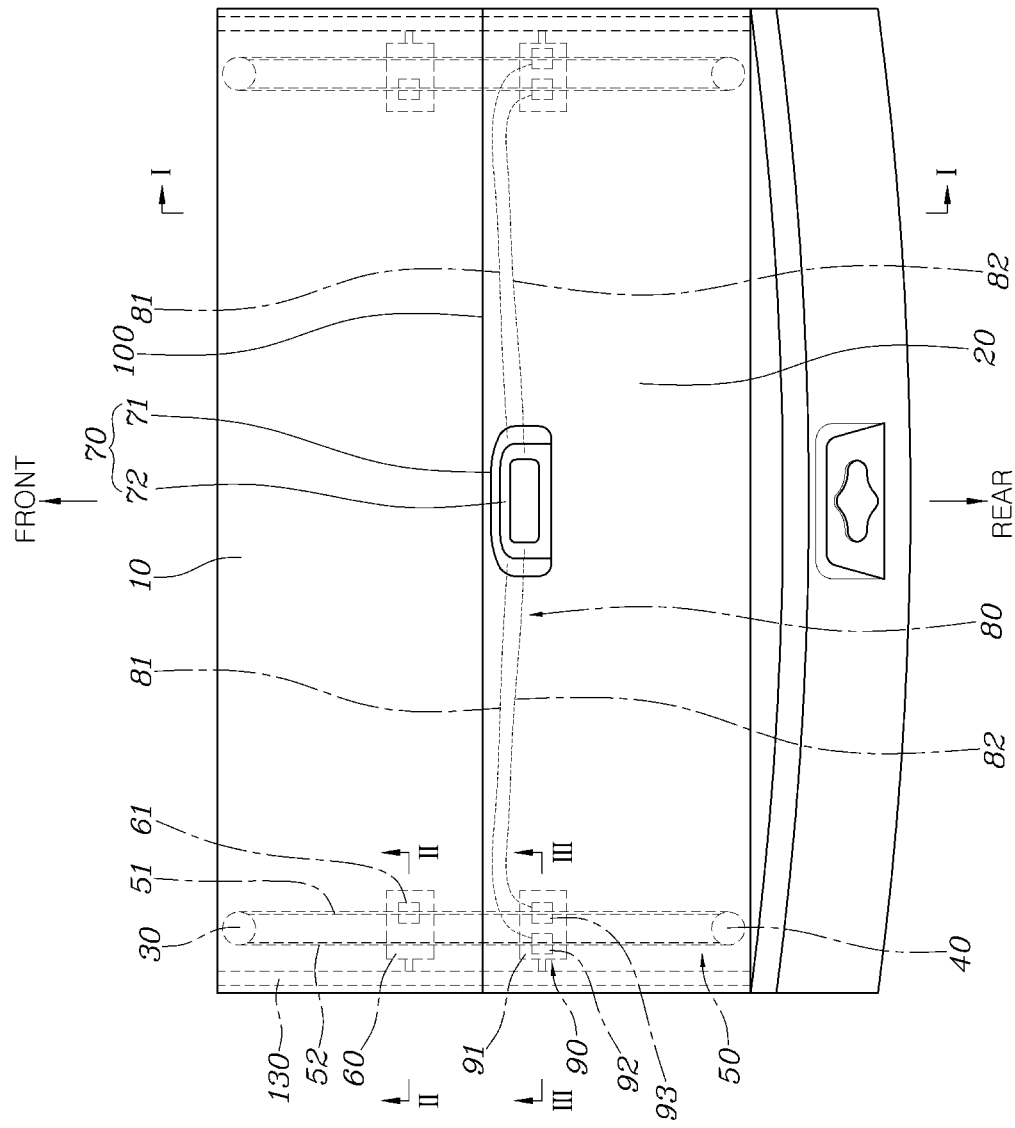

FIG. 3A
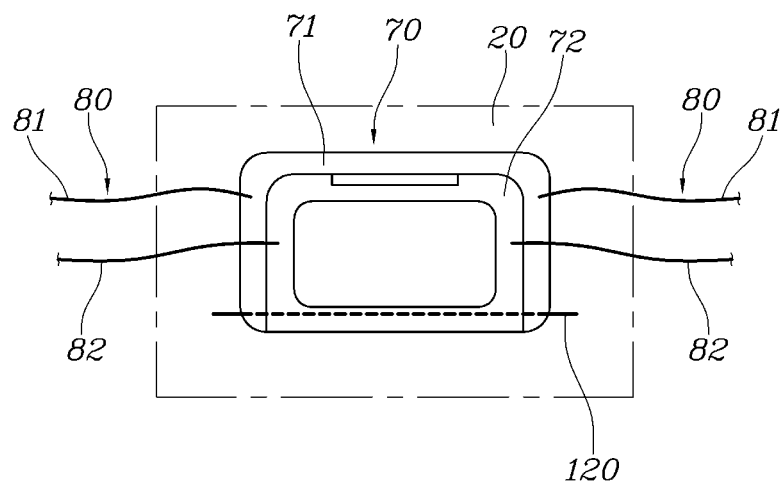
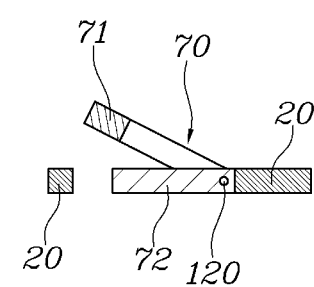
FIG. 3B
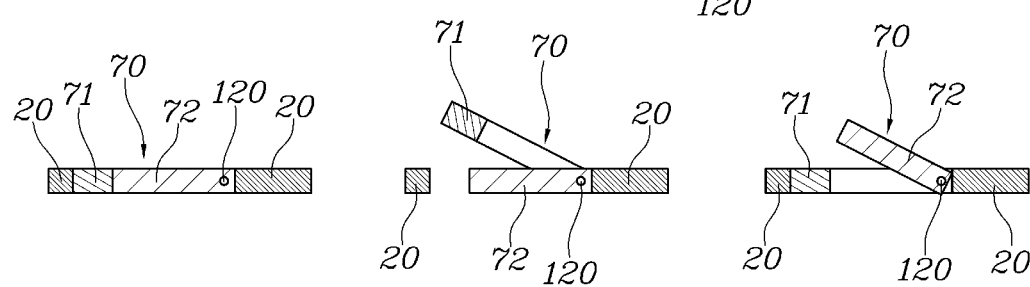
FIG. 3C
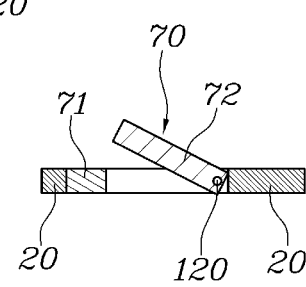
FIG. 3D

FIG. 9A
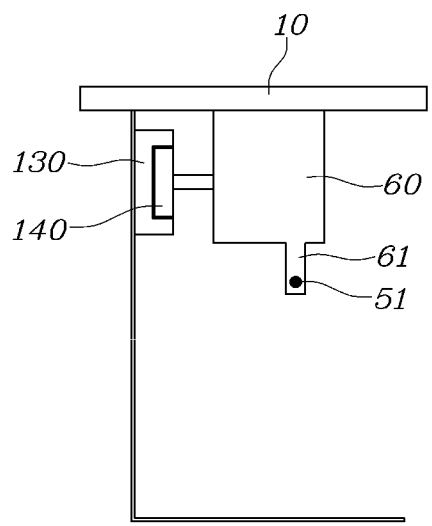
FIG. 9B
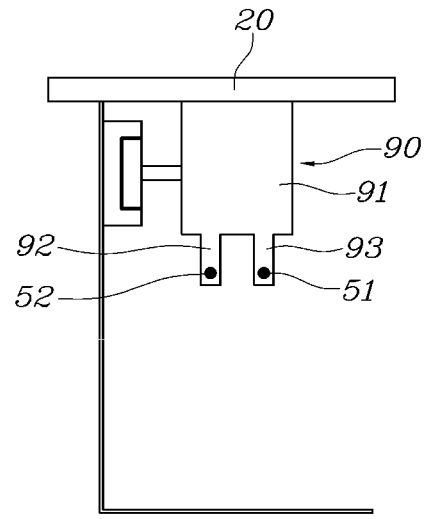
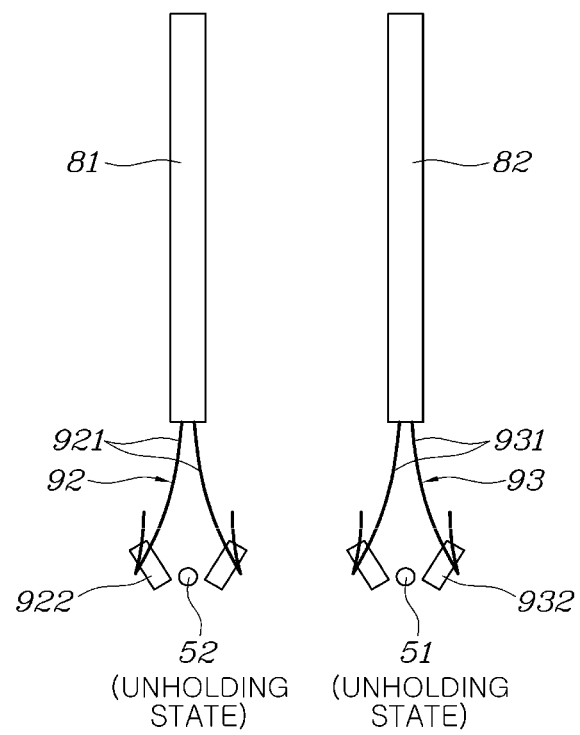
FIG. 9C

FIG. 12A
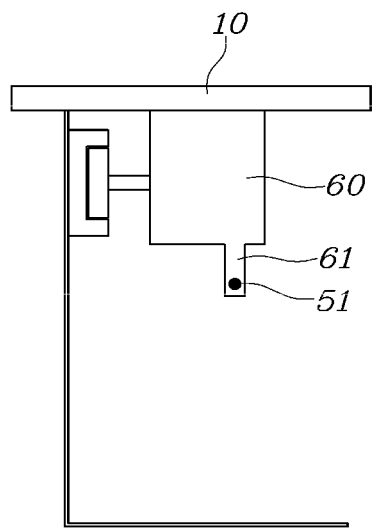
FIG. 12B
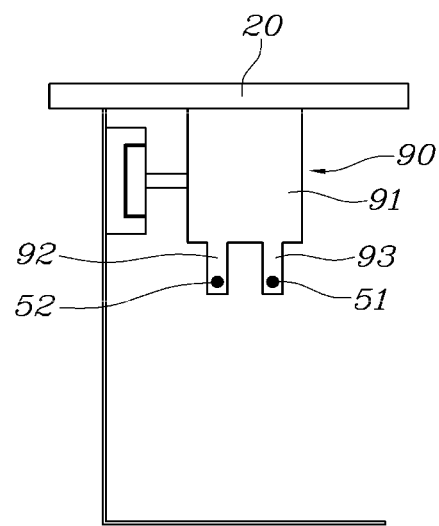
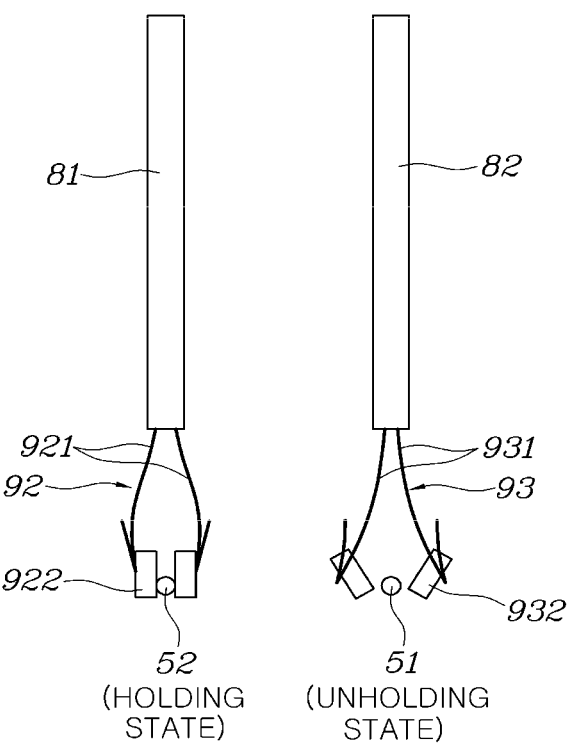
FIG. 12C

FIG. 15A
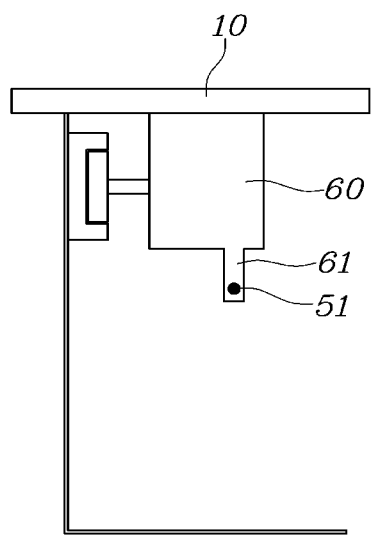
FIG. 15B
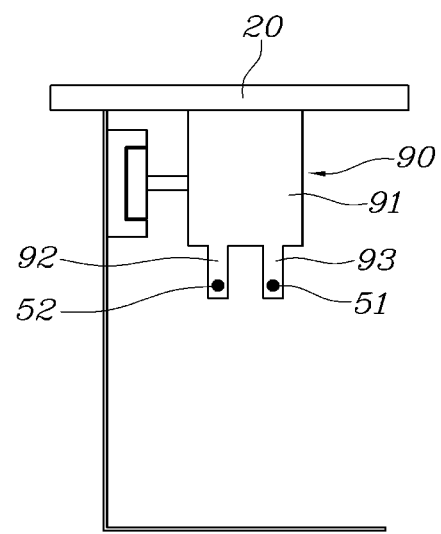
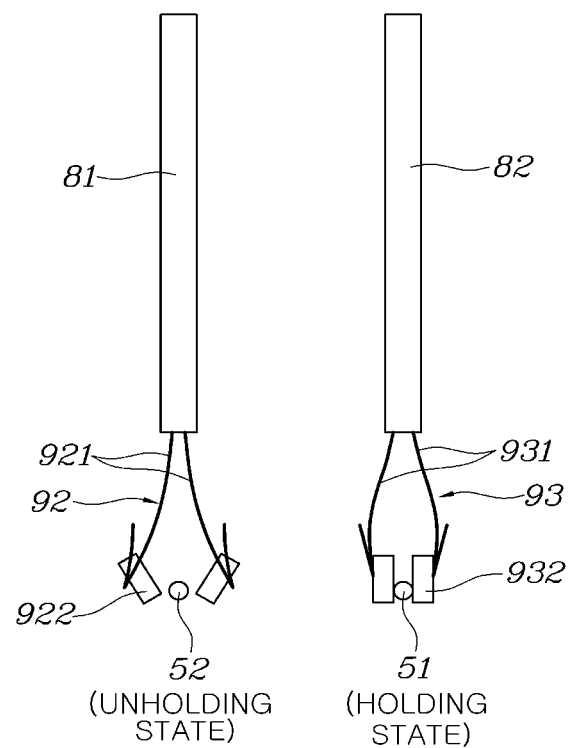
FIG. 15C

LUGGAGE BOARD APPARATUS FOR VEHICLE

CROSS REFERENCE TO RELATED APPLICATION

The present application claims priority to Korean Patent Application No. 10-2020-0023358, filed Feb. 26, 2020, the entire contents of which is incorporated herein for all purposes by this reference.

BACKGROUND

1. Technical Field

The present disclosure relates to a luggage board apparatus for a vehicle, and more particularly, to a luggage board apparatus for a vehicle in which a luggage board is separated into a front board and a rear board and the front board and the rear board are simultaneously operable and individually operable by an operation mechanism.

2. Description of the Related Art

Recreational vehicles (RVs) (sports utility vehicles (SUVs), multi-purpose vehicles (MPVs), etc.) are provided with a luggage compartment into which luggage may be loaded behind a rear seat. A floor of the luggage room includes a luggage board, and a luggage tray that may store spare tires or tools and the luggage tray is disposed below the luggage board. Accordingly, a storage space of the luggage tray is opened or closed by the opening and closing operation of the luggage board. In other words, the luggage board may be disposed on the floor of the luggage room and be a cover to an additional storage space.

A general structure of a conventional luggage board is a structure in which a luggage board is mounted on a luggage tray. In particular, since the luggage board is not capable of being moved in the front-rear direction of the vehicle, there is a disadvantage during loading or drawing the luggage on or from the luggage board. In other words, in the case in which the luggage board is a structure moved in the front-rear direction of the vehicle, the worker may load the luggage on the luggage board from a rear position of the vehicle and then move the luggage board forward. As a result, since the luggage may be easily moved toward the front of the luggage room, a rear space of the luggage room may be secured more easily.

Conversely, in a case in which the luggage is drawn by moving the luggage board toward the rear of the vehicle even when the luggage is drawn, the worker may more easily draw the luggage from the luggage board. In addition, the conventional general luggage board is a structure of a single board formed in one panel type. Therefore, a lower space of the luggage board may only be partially opened.

The contents described as the related art have been provided merely to assist in understanding the background of the present disclosure and should not be considered as corresponding to the related art known to those having ordinary skill in the art.

SUMMARY

The present disclosure provides a luggage board apparatus for a vehicle capable of improving convenience when storing and drawing luggage by allowing a luggage board, which is separated into a front board and a rear board, to move in the front-rear direction of the vehicle in a luggage room, and particularly, significantly improving convenience in use as a lower space of the luggage board may be partially opened by the front board and the rear board that are simultaneously operable and individually operable by an operation mechanism.

According to an exemplary embodiment of the present disclosure, a luggage board apparatus for a vehicle may include: a front board and a rear board installed to be movable within a luggage room. The rear board may be moved independently of the front board or may be moved together with the front board, and when the front board and the rear board are moved together, the front board and the rear board may be moved in different directions or in the same direction.

The front board and the rear board may be installed to be disposed along the front-rear direction of the vehicle. The front board and the rear board may be slidable along the front-rear direction of the vehicle, and the movement of the front board and the rear board may be performed by either a manual movement structure or an electric movement structure using a motor, a rack, and a pinion.

According to another exemplary embodiment of the present disclosure, a luggage board apparatus for a vehicle may include: a front board and a rear board installed to be movable within a luggage room; a front roller and a rear roller installed to be spaced apart from each other along a movement direction of the front board and the rear board; a roller wire installed as a conveyor belt type while surrounding the front roller and the rear roller and installed to be moved together with rotation of the roller; a front board block fixed to the front board and integrally coupled to the roller wire; and a holding mechanism fixed to the rear board, connected to an operating handle through a cable, and configured to hold and release the roller wire when operating the operating handle.

The luggage board apparatus for a vehicle may further include: a guide mil fixedly installed on a luggage tray that forms the luggage room to extend along the movement direction of the front board and the rear board; and guide rollers inserted into the guide rail to move along the guide mil and connected to the front board block and the holding mechanism, respectively. The front board and the rear board may be installed to be slidable along the front-rear direction while being disposed along the front-rear direction within the luggage room.

The front roller and the rear roller may be installed to be disposed in a horizontal direction, and the roller wire may have an inner portion and an outer portion that are installed to be in parallel to each other in the horizontal direction. The roller wire surrounding circumferences of the front roller and the rear roller may be partitioned into an inner portion and an outer portion that are in parallel to each other in a horizontal direction, and the front board block may connect the front board and the inner portion of the roller wire to each other.

The roller wire surrounding circumferences of the front roller and the rear roller may be partitioned into an inner portion and an outer portion that are in parallel to each other in a horizontal direction, and the holding mechanism may include: a holder housing fixed to the rear board, an outer wire holder disposed in the holder housing, connected to the cable of the operating handle, and configured to hold and release the outer portion of the roller wire when operating the operating handle, and an inner wire holder disposed in the holder housing, connected to the cable of the operating handle, and configured to hold and release the inner portion of the roller wire when operating the operating handle. The outer wire holder and the inner wire holder may be configured so that ends of two steel rods perform a retracting motion and an opening motion while the two steel rods rotate with respect to the holder housing, and friction pads that hold the roller wire may be coupled to the ends of the two steel rods, respectively.

The operating handle may include an outer handle and an inner handle rotatably coupled to the rear board via a handle shaft, the outer handle and the inner handle may be individually rotatable about one handle shaft while the inner handle is positioned in the outer handle. The cable may include an outer cable that connects the outer handle and the outer wire holder, and an inner cable that connects the inner handle and the inner wire holder. When the outer handle is laid down to be in parallel to the rear board, the ends of the steel rods of the outer wire holder may maintain an opened state, and the outer portion of the roller wire may change to a release state in which the outer portion of the roller wire is not connected to the outer wire holder. When the outer handle rotates in a direction in which the outer handle is erected with respect to the rear board, the ends of the steel rods of the outer wire holder may perform the retracting motion, and the outer portion of the roller wire may change to a holding state in which the outer portion of the roller wire is connected to the outer wire holder.

When the inner handle is laid down to be in parallel to the rear board, the ends of the steel rods of the inner wire holder may maintain an opened state, and the inner portion of the roller wire may change to a release state in which the inner portion of the roller wire is not connected to the inner wire holder. When the inner handle rotates in a direction in which the inner handle is erected with respect to the rear board, the ends of the steel rods of the inner wire holder may perform the retracting motion, and the inner portion of the roller wire may change to a holding state in which the inner portion of the roller wire is connected to the inner wire holder.

Only the rear board may be moved to the rear and a lower portion of the rear board may be opened, as the outer portion of the roller wire changes to the release state in which the outer portion of the roller wire is not connected to the outer wire holder and the inner portion of the roller wire changes to the release state in which inner portion of the roller wire is not connected to the inner wire holder, in a holding state in which the front board block and the inner portion of the roller wire are always connected to each other when the rear board is pulled to the rear in a state in which the outer handle and the inner handle are all laid down.

The front board may be moved to the front and at the same time the rear board may be moved to the rear and thus, lower portions of the front board and the rear board may be opened simultaneously, as the outer portion of the roller wire changes to the holding state in which the outer portion of the roller wire is connected to the outer wire holder and the inner portion of the roller wire changes to the release state in which the inner portion of the roller wire is not connected to the inner wire holder, in a holding state in which the front board block and the inner portion of the roller wire are always connected to each other when the rear board is pulled to the rear in a state in which the outer handle is rotated to be erected and the inner handle is laid down.

Both the front board and the rear board may be moved simultaneously to the rear and a position of a parting line that partitions the front board and the rear board may be changed to a rear position by the simultaneous reward movement of the front board and the rear board, as the outer portion of the roller wire changes to the release state in which the outer portion of the roller wire is not connected to the outer wire holder and the inner portion of the roller wire changes to the holding state in which the inner portion of the roller wire is connected to the inner wire holder, in a holding state in which the front board block and the inner portion of the roller wire are always connected to each other when the rear board is pulled to the rear in a state in which the outer handle is laid down and the inner handle is rotated to be erected.

The operating handle may be installed to be positioned at an intermediate point dividing a length in the left and right directions of the rear board while being positioned at a front side of the rear board, and the front roller and the rear roller, the roller wire, the front board block, the holding mechanism, the cable, the guide mil, and the guide rollers may be installed symmetrically centering on the operating handle.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present invention, and wherein:

FIG. 2 is a plan view of the luggage board apparatus according to an exemplary embodiment of the present disclosure;

FIGS. 3A-3D are views for describing an operating handle according to an exemplary embodiment of the present disclosure;

FIGS. 8, 9a-9c, 10 are views for describing a state in which only a rear board is moved to the rear of the vehicle and is opened according to an exemplary embodiment of the present disclosure;

FIGS. 11, 12a-12c, 13 are views for describing a state in which a front board and a rear board are simulatenously moved in opposite directions and are opened according to an exemplary embodiment of the present disclosure;

FIGS. 14, 15a-15c, 16 are views for describing a state in which a position of a parting line is changed by simultaneoulsy moving the front board and the rear board to the rear according to an exemplary embodiment of the present disclosure.

DETAILED DESCRIPTION

It is understood that the tem "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a luggage board apparatus for a vehicle according to exemplary embodiments of the present disclosure will be described with reference to the accompanying drawings.

FIGS. 1 to 17 illustrate a luggage board apparatus for a vehicle according to an exemplary embodiment of the present disclosure. According to an exemplary embodiment of the present disclosure, a luggage board may be separated into a front board 10 and a rear board 20, both the front board 10 and the rear board 20 may be installed to be movable within a luggage room 1, the rear board 20 may be moved independently of the front board 10 or may be moved together with the front board 10. In particular, when the front board 10 and the rear board 20 are moved together, the front board 10 and the rear board 20 may be moved in different directions or in the same direction.

Figure 17:
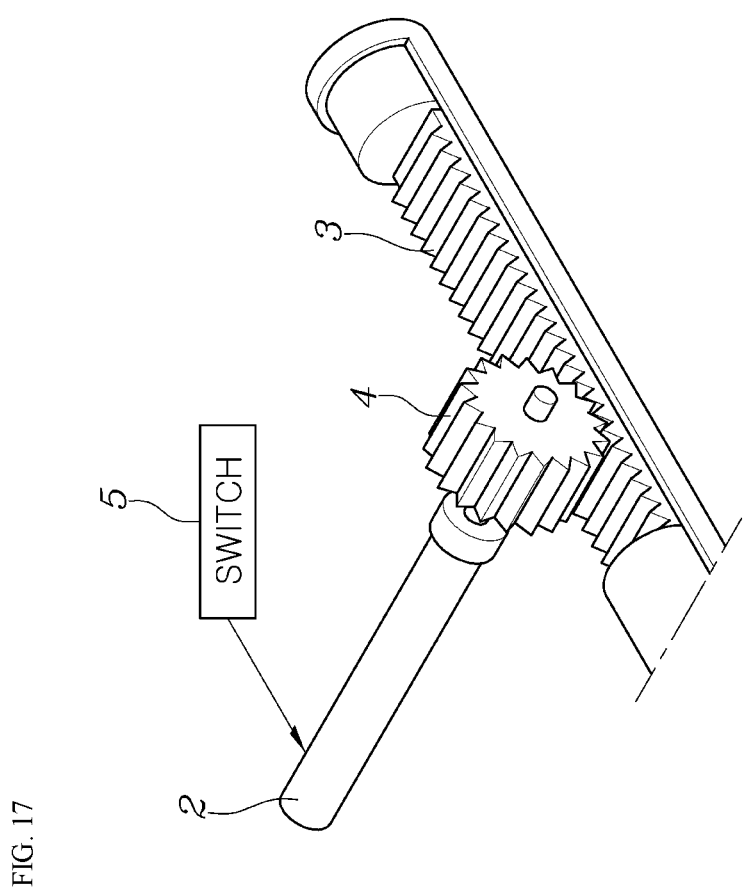
FIG. 17 is a view for describing an example of an electric operation mechanism according to another exemplary embodiment of the present disclosure.

The front board 10 and the rear board 20 may be installed to be disposed in the luggage room 1 along the front-rear direction of the vehicle, and particularly, the front board 10 and the rear board 20 may be installed to be able to slide along the front-rear direction of the vehicle. Particularly, the movement of the front board 10 and the rear board 20 may be performed by either a manual movement structure by a worker or an electric movement structure using a motor 2, a rack 3, and a pinion 4 as illustrated in FIG. 17. An operation of the motor 2 may be performed by the worker operating a switch 5. The manual movement structure is relatively inexpensive compared to the electric type, while the electric movement structure is relatively easy to use.

The exemplary embodiment according to the present disclosure is based on a manual movement structure, and a detailed configuration will be described in detail with reference to FIGS. 1 to 16. A luggage board apparatus for a vehicle according to the present disclosure may include a front board 10 and a rear board 20 installed to be movable within a luggage room 1; a front roller 30 and a rear roller 40 installed to be spaced apart from each other along a movement direction of the front board 10 and the rear board 20; a roller wire 50 installed as a conveyor belt type while surrounding the front roller 30 and the rear roller 40 and installed to be moved together with rotation of the roller; a front board block 60 fixed to the front board 10 and integrally coupled to the roller wire 50; and a holding mechanism 90 fixed to the rear board 20, connected to an operating handle 70 via a cable 80, and configured to hold and release the roller wire 50 when operating the operating handle 70.

The front board 10 may be disposed at a front position of the luggage room 1, the rear board 20 may be disposed at a rear position of the front board 10, a rear surface of the front board 10 and a front surface of the rear board 20 may be installed to be in contact with each other, and the rear surface of the front board 10 and the front surface of the rear board 20 that are in contact with each other become a parting line 100 that partitions regions of the front board 10 and the rear board 20. The front board 10 and the rear board 20 may slide, respectively. When the front board 10 moves to the front, a front portion of the front board 10 may move downward and change to a hidden state to not be exposed to the outside. When the rear board 20 moves to the rear, a rear portion of the rear board 20 may also move downward and change to a hidden state not to be exposed to the outside.

The front roller 30 and the rear roller 40 may be disposed in a line to be spaced apart from each other in the front-rear direction. In particular, both the front roller 30 and the rear roller 40 may be disposed in a horizontal direction, a first end of each of the roller shafts 31 and 41 may be coupled to each of the centers of the front roller 30 and the rear roller 40 and thus, the front roller 30 and the rear roller 40 may rotate around the roller shafts 31 and 41, and second ends of the roller shafts 31 and 41 may be fixedly coupled to the luggage tray 110. The roller wire 50 installed in the track type while surrounding circumferential surfaces of the front roller 30 and the rear roller 40 may be structured such that an inner portion 51 and an outer portion 52 are disposed in parallel in the horizontal direction.

The inner portion 51 of the roller wire 50 is a wire positioned toward an inner side direction of the board with respect to the roller, and conversely, the outer portion 52 of the roller wire 50 is a wire positioned toward an outer side direction of the board with respect to the roller. When the front roller 30 and the rear roller 40 rotate, the roller wire 50 may be moved in the front-rear direction in the same manner as a conveyor belt, and conversely, when the roller wire 50 moves, the front roller 30 and the rear roller 40 may rotate.

The front board block 60 may connect the front board 10 and the inner portion 51 of the roller wire 50. In other words, an upper end of the front board block 60 may be coupled to the front board 10 to be integrated with the front board 10. The front board block 60 may include a protrusion 61 that extends downward, and the protrusion 61 may be coupled to the inner portion 51 of the roller wire 50 to form an integrated structure.

Since the protrusion 61 of the front board block 60 and the inner portion 51 of the roller wire 50 always maintain a connected state, the front board block 60 and the inner portion 51 of the roller wire 50 may always be maintained in a holding state. As another example, the protrusion 61 of the front board block 60 may be configured with the same configuration as an outer wire holder or inner wire holder described later. In this case, the protrusion 60 may hold the inner portion 51 of the roller wire 50 and thus, the inner portion 51 of the roller wire 50 may always be in the holding state.

The holding mechanism 90 may be configured to hold or release the rear board 20 and the inner portion 51 and the outer portion 52 of the roller wire 50 as needed. In particular, the holding mechanism 90 may include a holder housing 91 fixed to the rear board 20, an outer wire holder 92 provided with the holder housing 91, connected to the cable 80 of the operating handle 70, and configured to hold or release the outer portion 52 of the roller wire 50 when operating the operating handle 80, and an inner wire holder 93 provided with the holder housing 91, connected to the cable 80 of the operating handle 70, and configured to hold and release the inner portion 51 of the roller wire 50 when operating the operating handle 70.

Figure 1:
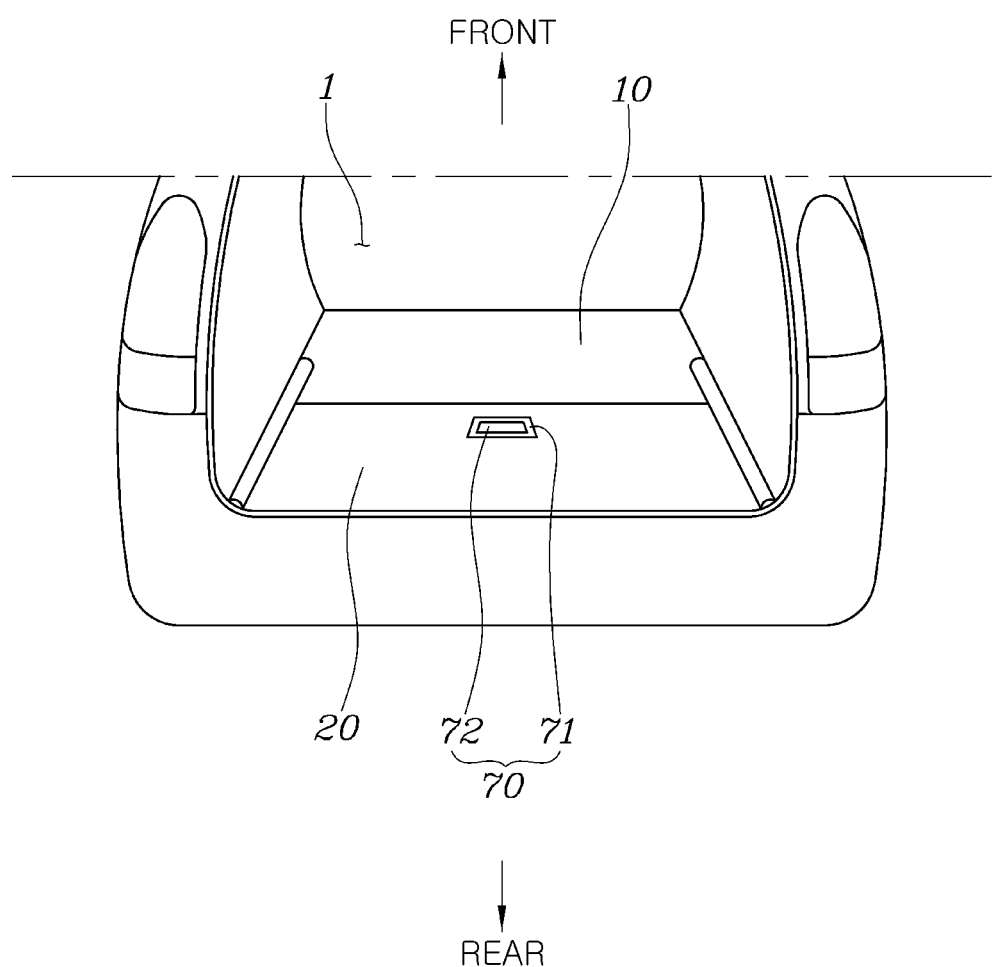
FIG. 1 is a view illustrating a state in which a luggage board apparatus according to an exemplary embodiment of the present disclosure is installed in a luggage room of a vehicle.
Figure 4:
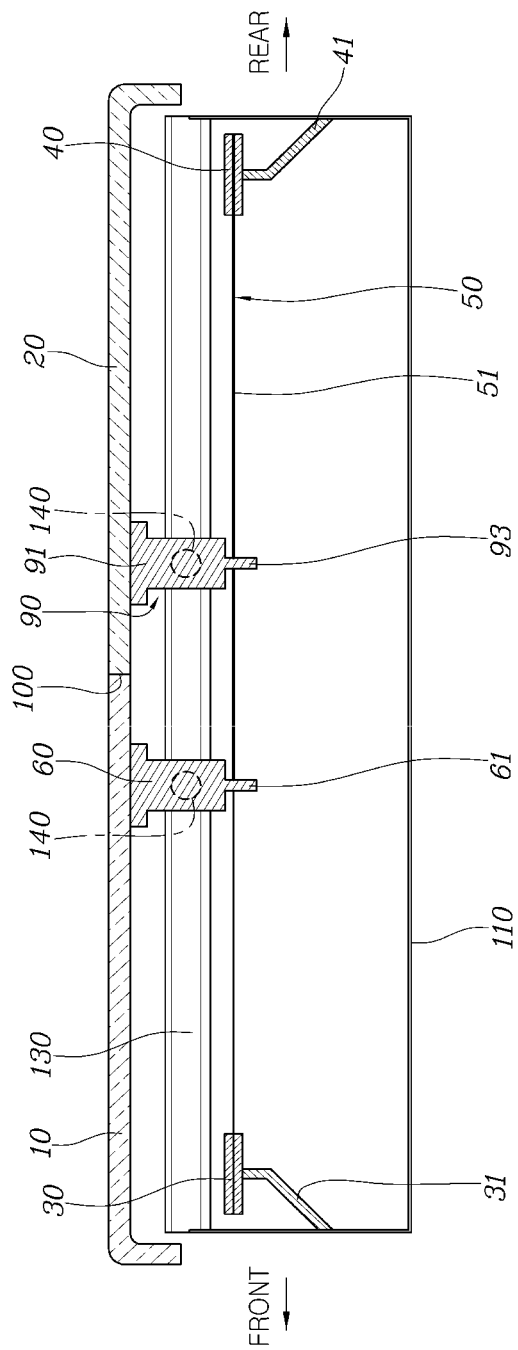
FIGS. 4 to 6 are cross-sectional views taken along line I-I, line II-II, and line of FIG. 2, and FIGS. 5 and 6 are views for describing a front board block and a holding mechanism according to an exemplary embodiment of the present disclosure.
Figure 5:
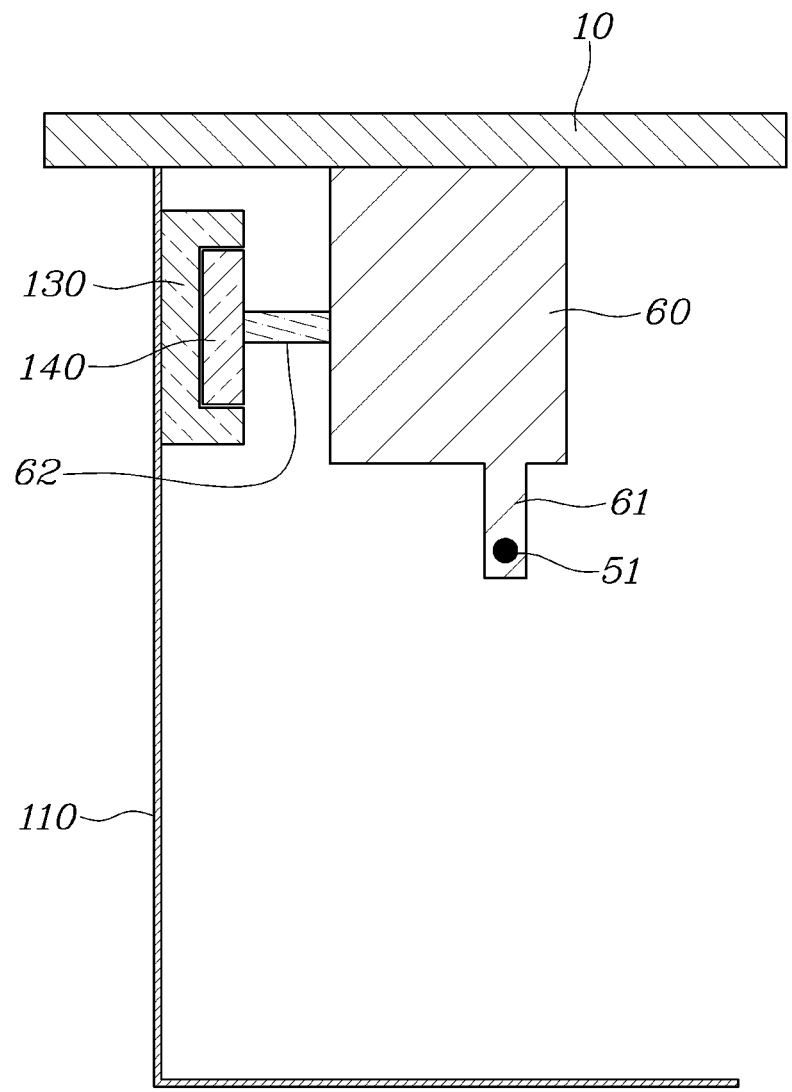
Figure 6:
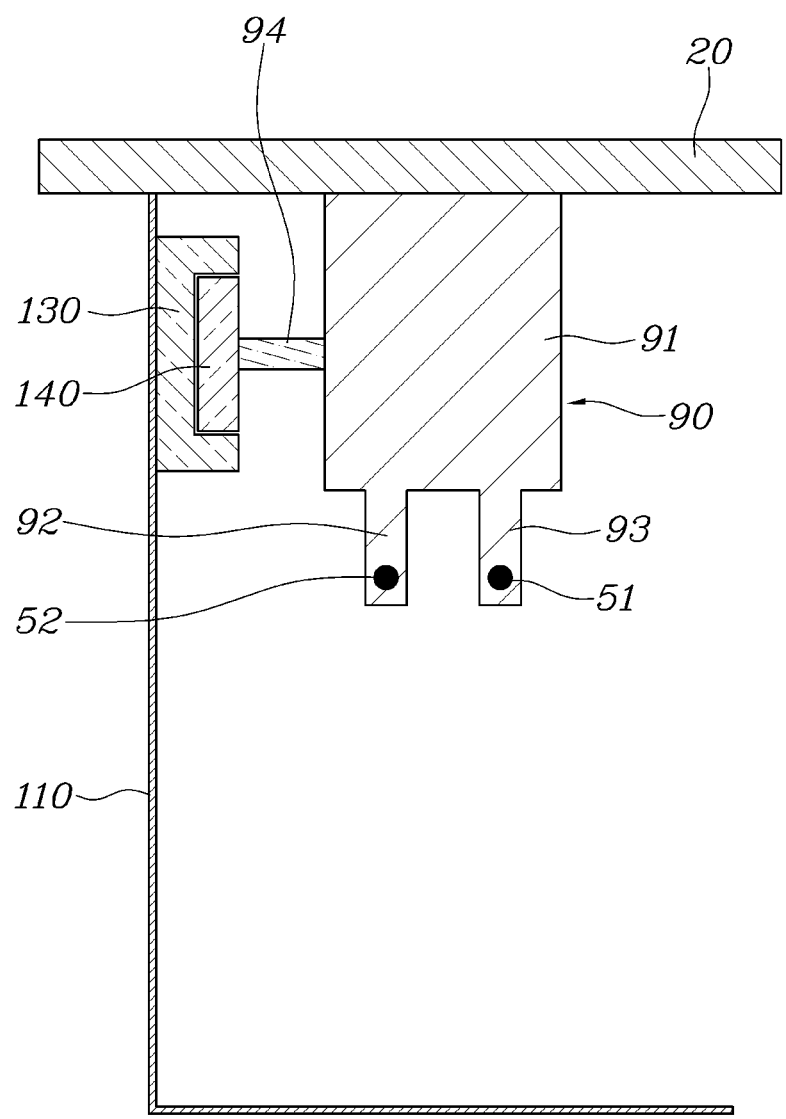
Figure 7:
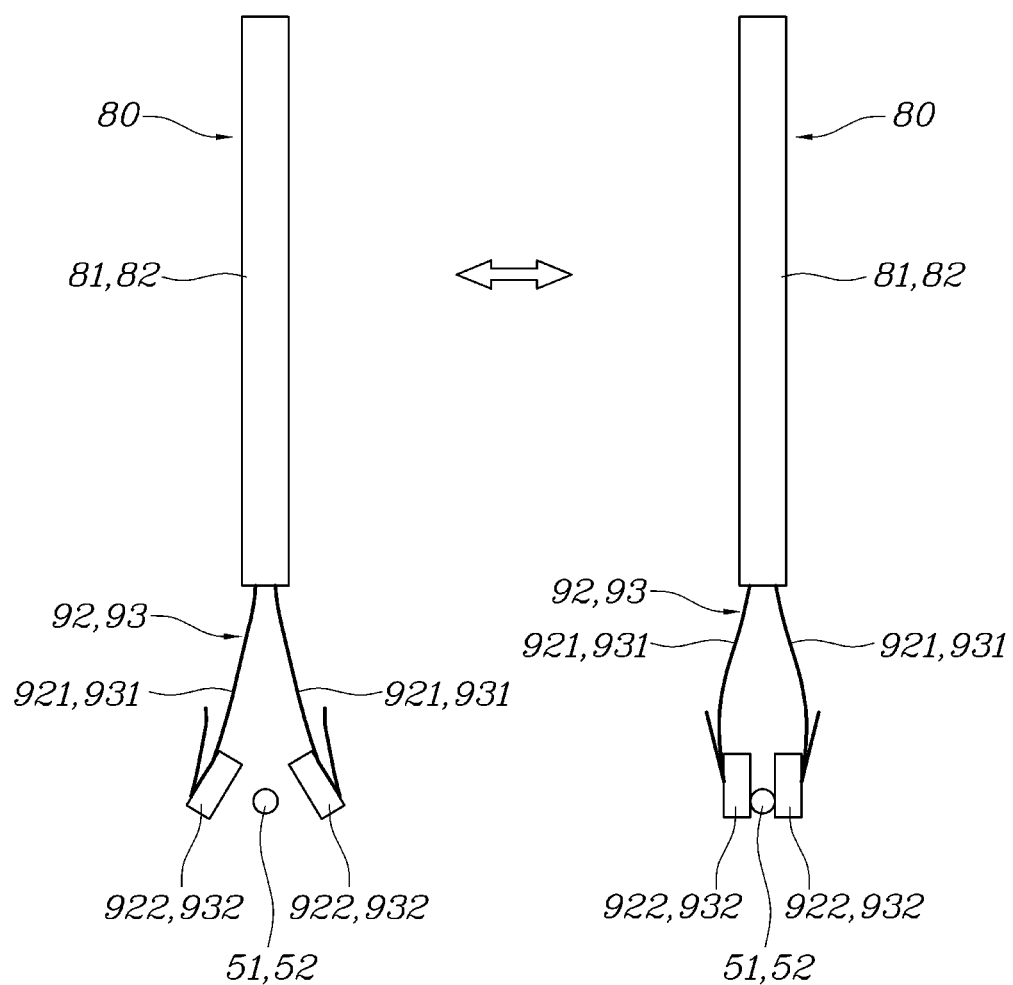
FIG. 7 is view for describing an outer wire holder and an inner wire holder according to an exemplary embodiment of the present disclosure.

As illustrated in FIG. 7, the outer wire holder 92 and the inner wire holder 93 have the same configuration, and the left drawing is in a release state, and the right drawing is in a holding state. The outer wire holder 92 and the inner wire holder 93 may be configured to rotate with respect to the holder housing 91 while two steel rods 921 and 931 are respectively connected to the cable 80, during the pulling and unwinding operation of the cable 80, ends of the two steel rods 921 and 931 perform a retracting motion and an opening motion, and friction pads 922 and 932 that hold the inner portion 51 or the outer portion 52 of the roller wire 50 may be coupled to the ends of the two steel rods 921 and 931, respectively.

When the ends of the two steel rods 921 and 931 are retracted by the pulling of the cable 80, as the friction pads 922 and 932 hold the inner portion 51 or the outer portion 52 of the roller wire 50, the inner portion 51 or the outer portion 52 of the roller wire 50 may maintain the holding state. Conversely, when the ends of the two steel rods 921 and 931 are opened by the unwinding of the cable 80, the inner portion 51 or the outer portion 52 of the roller wire 50 may change to the release state. The operating handle 70 may include an outer handle 71 and an inner handle 72 rotatably coupled to the rear board 20 via a handle shaft 120, and the outer handle 71 and the inner handle 72 may be individually rotatable about one handle shaft 120 while the inner handle 72 is positioned in the outer handle 71.

FIG. 3A is a plan view of the operating handle 70 installed on the rear board 20 as viewed from above, and lower figures are side views illustrating an operating state of the outer handle 71 and the inner handle 72. FIG. 3B, illustrates a state in which the outer handle 71 and the inner handle 72 are both laid down to be in parallel to the rear board 20, FIG. 3C illustrates a state in which the outer handle 71 is rotated about the handle shaft 120 and is erected and the inner handle 72 is laid down, and FIG. 3D illustrates a state in which the outer handle 71 is laid down and the inner handle 72 is rotated about the handle shaft 120 and is erected.

As illustrated, the outer handle 71 and the inner handle 72 may be configured to be individually rotatable about one handle shaft 120. The cable 80 according to the present disclosure may include an outer cable 81 that connects the outer handle 71 and an outer wire holder 92, and an inner cable 82 that connects the inner handle 72 and the inner wire holder 93.

Therefore, when the outer handle 71 is laid down to be in parallel to the rear board 20, the ends of the steel rods 921 of the outer wire holder 92 maintain an opened state, and the outer portion 52 of the roller wire 50 changes to a release state in which the outer portion 52 of the roller wire 50 is not connected to the outer wire holder 92. When the outer handle 71 rotates in a direction in which the outer handle 71 is erected with respect to the rear board 20, the ends of the steel rods 921 of the outer wire holder 92 perform the retracting motion, and the outer portion 52 of the roller wire 50 changes to a holding state in which the outer portion 52 of the roller wire 50 is connected to the outer wire holder 92.

In addition, when the inner handle 72 is laid down to be in parallel to the rear board 20, the ends of the steel rods 931 of the inner wire holder 93 maintain the opened state, and the inner portion 51 of the roller wire 50 changes to the release state in which the inner portion 51 of the roller wire 50 is not connected to the inner wire holder 93. When the inner handle 72 rotates in a direction in which the inner handle 72 is erected with respect to the rear board 20, the ends of the steel rods 931 of the inner wire holder 93 perform the retracting motion, and the inner portion 51 of the roller wire 50 changes to the holding state in which the inner portion 51 of the roller wire 50 is connected to the inner wire holder 93.

The luggage board apparatus for a vehicle may further include a guide mil 130 fixedly installed on the luggage tray 110 forming the luggage room 1 to extend along the movement direction (e.g., front-rear direction) of the front board 10 and the rear board 20, and guide rollers 140 may be inserted into the guide rail 120 to move along the guide mil 120 and may be connected to the front board block 60 and the holding mechanism 90, respectively. A roller shaft 62 that may extend laterally from the front board block 60, the center of the guide roller 140 may be coupled to an end portion of the roller shaft 62 and thus, the guide roller 140 may be configured to rotate about the roller shaft 62, and the guide roller 140 rotatably coupled to the roller shaft 62 may be inserted into the guide mil 130 disposed on the side of the front board 10 to be installed to be movable along the guide rail 130. In addition, a roller shaft 94 may extend laterally from the holder housing 91, the center of the guide roller 140 may be coupled to an end portion of the roller shaft 94 and thus, the guide roller 140 may be configured to rotate about the roller shaft 94, and the guide roller 140 rotatably coupled to the roller shaft 94 may be inserted into the guide rail 130 disposed on the side of the rear board 20 to be installed to be movable along the guide rail 130.

According to the present disclosure, the operating handle 70 may be installed to be positioned at an intermediate point dividing a length in the left and right directions of the rear board 20 while being positioned at the front side of the rear board 20, and the front roller 30 and rear roller 40, the roller wire 50, the front board block 60, the holding mechanism 90, the cable 80, the guide rail 130, the guide rollers 140 may be installed symmetrically centering on the operating handle 70, thereby making it possible to form a structure in which the front board 10 and the rear board 20 may operate in a more stable state.

Hereinafter, an operation of the luggage board apparatus for a vehicle according to an exemplary embodiment of the present disclosure will be described. FIGS. 2 and 4 to 6 illustrate a state in which the parting line 100 of the front board 10 and the rear board 20 is positioned at an intermediate point along the front-rear direction of the luggage room 1, a state in which the luggage tray 100 is covered with the front board 10 and the rear board 20 to block exposure to the outside, and a state in which the outer handle 71 and the inner handle 72 of the operating handle 70 are all laid down to be in parallel to the rear board 20.

Figure 8:
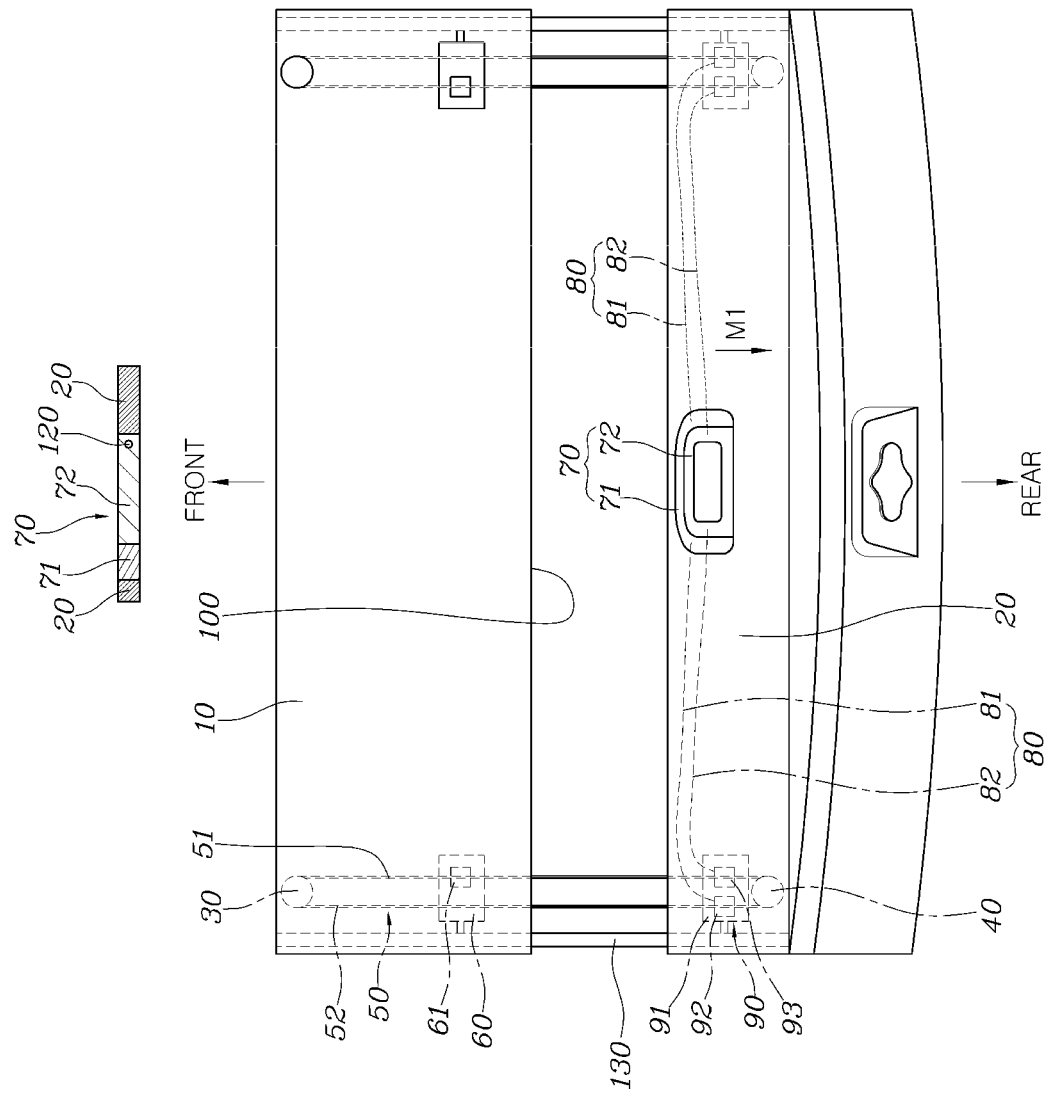
Figure 10:
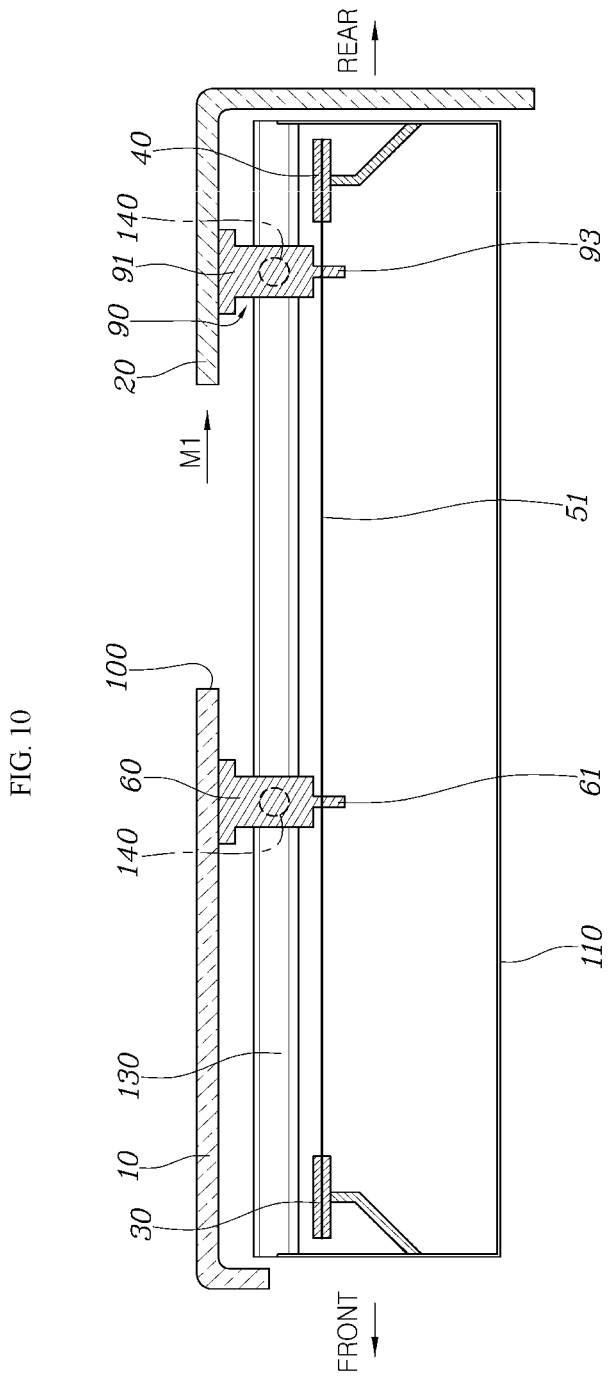

As described above, when the outer handle 71 and the inner handle 72 of the operating handle 70 are laid down to be in parallel to the rear board 20, when the worker puts his hand into the operating handle 70 and pulls the rear board 20 to the rear as illustrated in FIGS. 8 to 10, the outer portion 52 of the roller wire 50 may maintain the release state in which the outer portion 52 of the roller wire 50 is not connected to the outer wire holder 92 and the inner portion 51 of the roller wire 50 may maintain the release state in which the inner portion 51 of the roller wire 50 is not connected to the inner wire holder 93 in the holding state in which the front board block 60 and the inner portion 51 of the roller wire 50 are always connected to each other. As a result, only the rear board 20 is moved to the rear (arrow M1), thereby opening only a lower portion of the rear board 20 to be exposed to the outside.

Figure 11:
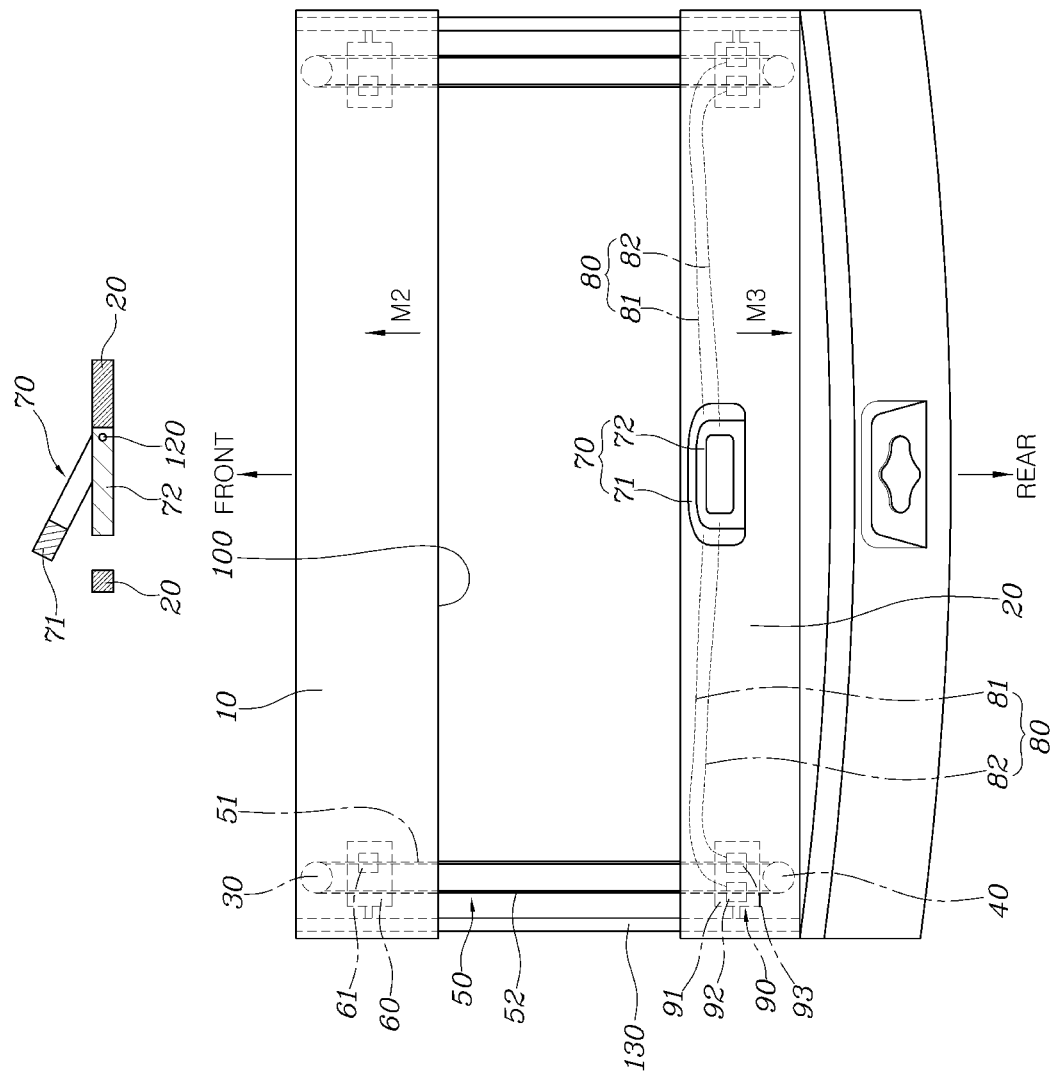
Figure 13:
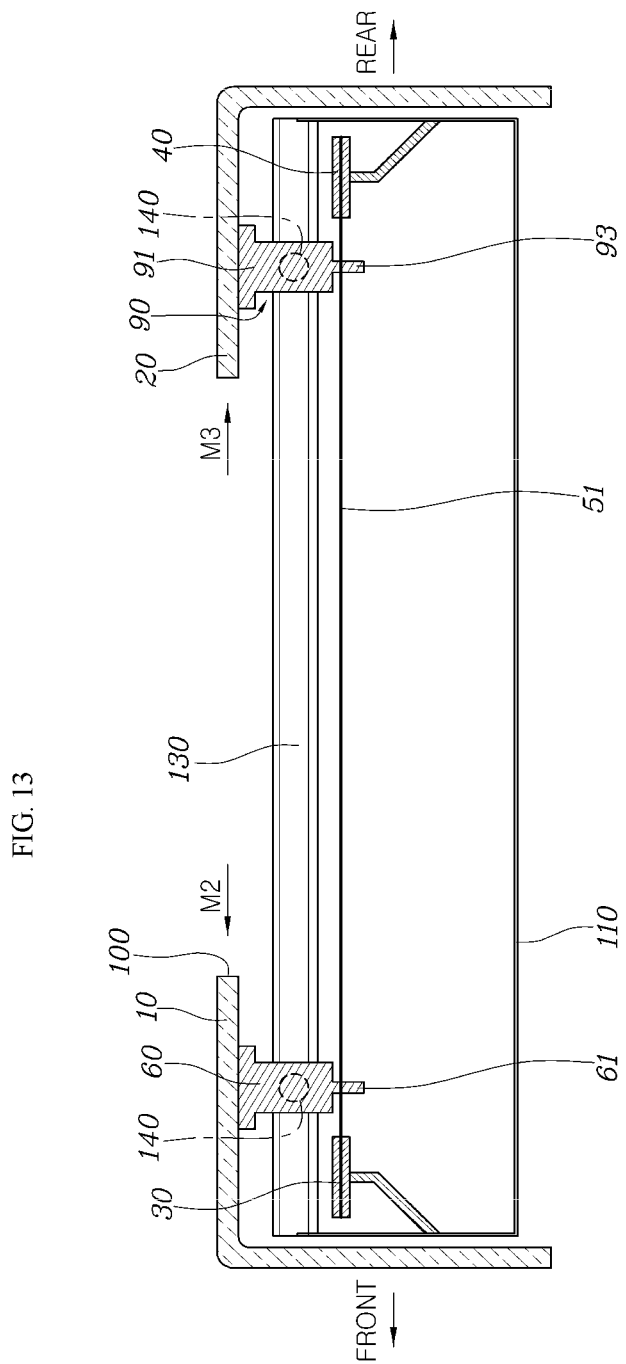

In addition, as illustrated in FIG. 2, when the outer handle 71 and the inner handle 72 of the operating handle 70 are laid down to be in parallel to the rear board 20, when the worker pulls the rear board 20 to the rear while maintaining the state in which only the outer handle 71 is rotated to be erected and the inner handle 72 is laid down as it is as illustrated in FIGS. 11 to 13, the outer portion 52 of the roller wire 50 may change to the holding state in which the outer portion 52 of the roller wire 50 is connected to the outer wire holder 92 and the inner portion 51 of the roller wire 50 may continue to maintain the release state in which the inner portion 51 of the roller wire 50 is not connected to the inner wire holder 93 in the holding state in which the front board block 60 and the inner portion 51 of the roller wire 50 are always connected to each other. As a result, the front board 10 is moved to the front (arrow M2) and the rear board 20 is moved to the rear (arrow M3) at the same time, thereby simultaneously opening lower portions of the front board 10 and the rear board 20 to be exposed to the outside.

Figure 14:
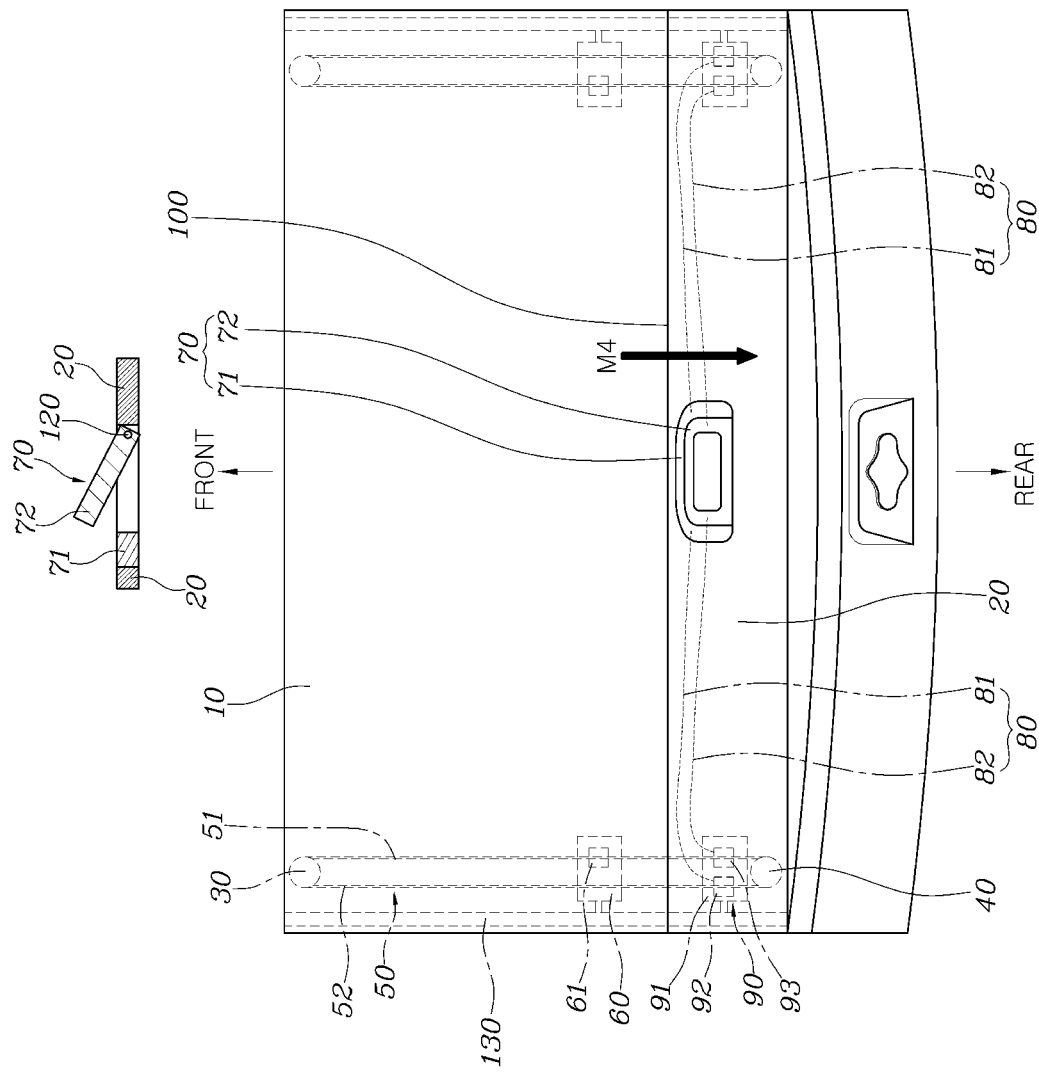
Figure 16:
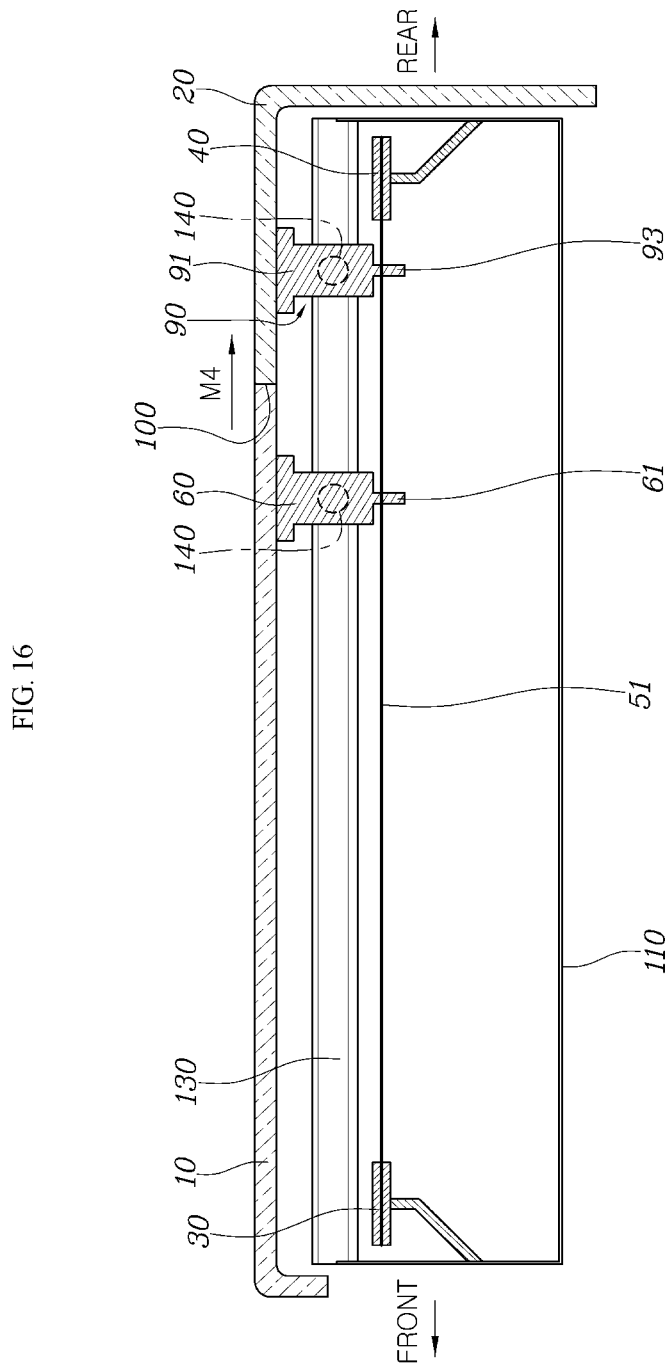

In addition, as illustrated in FIG. 2, when the outer handle 71 and the inner handle 72 of the operating handle 70 are laid down to be in parallel to the rear board 20, when the worker pulls the rear board 20 to the rear while maintaining the state in which the outer handle 71 is laid down and only the inner handle 72 is rotated to be erected as illustrated in FIGS. 14 to 16, the outer portion 52 of the roller wire 50 may continue to maintains the release state in which the outer portion 52 of the roller wire 50 is not connected to the outer wire holder 92 and the inner portion 51 of the roller wire 50 may change to the holding state in which the inner portion 51 of the roller wire 50 is connected to the inner wire holder 93 in the holding state in which the front board block 60 and the inner portion 51 of the roller wire 50 are always connected to each other.

As a result, both the front board 10 and the rear board 20 are simultaneously moved to the rear (arrow M4) and the position of the parting line 100 that partitions the front board 10 and the rear board 20 is changed to a rear position by the simultaneous reward movement of the front board 10 and the rear board 20. Through the change in the position of the parting line 100 as described above, an area of the luggage tray 110 exposed to the outside at the time of opening the front board 10 or the rear board 20 may be adjusted to suit the user's intention.

As described above, according to the exemplary embodiment of the present disclosure, the luggage board separated into the front board 10 and the rear board 20 may be moved in the front-rear direction of the vehicle in the luggage room 1, the front board 10 and the rear board 20 may be operable simultaneously and individually, and the position of the parting line 100 at which the front board 10 and the rear board 20 are in contact with each other may be adjusted to a position desired by the user, thereby making it possible to partially open the lower space of the luggage board, and to particularly, significantly improve convenience of work when storing and drawing the luggage. In particular, according to the exemplary embodiment of the present disclosure, when a locking mechanism 20 that restrains the operation of the luggage board 10 is released, the luggage board 10 positioned in the luggage room 1 may be automatically popped up at the top of a transverse trim 2 panel, thereby further improving the convenience in use, and improving productability.

According to the exemplary embodiment of the present disclosure, the luggage board separated into the front board and the rear board may be moved in the front-rear direction of the vehicle in the luggage room, the front board and the rear board may be operable simultaneously and individually, and a position of a parting line at which the front board and the rear board are in contact with each other may be adjusted to a position desired by the user, thereby making it possible to partially open the lower space of the luggage board, and to particularly, significantly improve convenience of work when storing and drawing the luggage.

Although the present disclosure has been shown and described with respect to exemplary embodiments, it will be apparent to those having ordinary skill in the art that the present disclosure may be variously modified and altered without departing from the spirit and scope of the present disclosure as defined by the following claims.

What is claimed is:

1. A luggage board apparatus for a vehicle, comprising:
a front board and a rear board installed to be movable within a luggage room of the vehicle;
a front roller and a rear roller installed to be spaced apart from each other along a movement direction of the front board and the rear board;
a roller wire installed as a conveyor belt type while surrounding the front roller and the rear roller and installed to be moved together based on rotation of the roller;
a front board block fixed to the front board and integrally coupled to the roller wire; and
a holding mechanism fixed to the rear board, connected to an operating handle through a cable, and configured to hold and release the roller wire in response to an operation of the operating handle.

2. The luggage board apparatus for a vehicle of claim 1, further comprising:
a guide rail fixedly installed on a luggage tray that form the luggage room and extending along the movement direction of the front board and the rear board; and
guide rollers inserted into the guide rail to move along the guide rail and connected to the front board block and the holding mechanism, respectively.

3. The luggage board apparatus for a vehicle of claim 2, wherein the front board and the rear board are installed to be slidable along the front-rear direction while disposed along the front-rear direction within the luggage room.

4. The luggage board apparatus for a vehicle of claim 1, wherein the front roller and the rear roller are installed to be disposed in a horizontal direction, and the roller wire has an inner portion and an outer portion that are installed to be in parallel to each other in the horizontal direction.

5. The luggage board apparatus for a vehicle of claim 1, wherein the roller wire surrounding circumferences of the front roller and the rear roller are partitioned into an inner portion and an outer portion that are in parallel to each other in a horizontal direction, and the front board block connects the front board and the inner portion of the roller wire.

6. The luggage board apparatus for a vehicle of claim 1, wherein the roller wire surrounding circumferences of the front roller and the rear roller are partitioned into an inner portion and an outer portion that are in parallel to each other in a horizontal direction, and the holding mechanism includes:
a holder housing fixed to the rear board;

an outer wire holder disposed in the holder housing, connected to the cable of the operating handle, and configured to hold and release the outer portion of the roller wire in response to an operation of the operating handle; and an inner wire holder disposed in the holder housing, connected to the cable of the operating handle, and configured to hold and release the inner portion of the roller wire when operating the operating handle.

7. The luggage board apparatus for a vehicle of claim 6, wherein the outer wire holder and the inner wire holder are configured so that ends of two steel rods perform a retracting motion and an opening motion while the two steel rods rotate with respect to the holder housing, and friction pads that hold the roller wire are coupled to the ends of the two steel rods, respectively.

8. The luggage board apparatus for a vehicle of claim 7, wherein the operating handle includes:
an outer handle and an inner handle rotatably coupled to the rear board via a handle shaft,
wherein the outer handle and the inner handle are rotatable individually about one handle shaft while the inner handle is positioned in the outer handle, and
wherein the cable includes an outer cable that connects the outer handle and the outer wire holder, and an inner cable that connects the inner handle and the inner wire holder.

9. The luggage board apparatus for a vehicle of claim 7, wherein when the outer handle is laid down to be in parallel to the rear board, the ends of the steel rods of the outer wire holder maintain an opened state, and the outer portion of the roller wire changes to a release state in which the outer portion of the roller wire is not connected to the outer wire holder, and when the outer handle rotates in a direction in which the outer handle is erected with respect to the rear board, the ends of the steel rods of the outer wire holder perform the retracting motion, and the outer portion of the roller wire changes to a holding state in which the outer portion of the roller wire is connected to the outer wire holder.

10. The luggage board apparatus for a vehicle of claim 9, wherein when the inner handle is laid down to be in parallel to the rear board, the ends of the steel rods of the inner wire holder maintain an opened state, and the inner portion of the roller wire change to a release state in which the inner portion of the roller wire is not connected to the inner wire holder, and when the inner handle rotates in a direction in which the inner handle is erected with respect to the rear board, the ends of the steel rods of the inner wire holder perform the retracting motion, and the inner portion of the roller wire changes to a holding state in which the inner portion of the roller wire is connected to the inner wire holder.

11. The luggage board apparatus for a vehicle of claim 10, wherein the rear board is moved to the rear and a lower portion of the rear board is opened, as the outer portion of the roller wire changes to the release state in which the outer portion of the roller wire is not connected to the outer wire holder and the inner portion of the roller wire changes to the release state in which inner portion of the roller wire is not connected to the inner wire holder, in a holding state in which the front board block and the inner portion of the roller wire are always connected to each other when the rear board is pulled to the rear in a state in which the outer handle and the inner handle are laid down.

12. The luggage board apparatus for a vehicle of claim 10, wherein the front board is moved to the front and at the same time the rear board is moved to the rear causing the lower portions of the front board and the rear board to open simultaneously, as the outer portion of the roller wire changes to the holding state in which the outer portion of the roller wire is connected to the outer wire holder and the inner portion of the roller wire changes to the release state in which the inner portion of the roller wire is not connected to the inner wire holder, in a holding state in which the front board block and the inner portion of the roller wire are always connected to each other when the rear board is pulled to the rear in a state in which the outer hand is rotated to be erected and the inner handle is laid down.

13. The luggage board apparatus for a vehicle of claim 10, wherein both the front board and the rear board are simultaneously moved to the rear and a position of a parting line that partitions the front board and the rear board is changed to a rear position by the simultaneous reward movement of the front board and the rear board, as the outer portion of the roller wire changes to the release state in which the outer portion of the roller wire is not connected to the outer wire holder and the inner portion of the roller wire changes to the holding state in which the inner portion of the roller wire is connected to the inner wire holder, in a holding state in which the front board block and the inner portion of the roller wire are always connected to each other when the rear board is pulled to the rear in a state in which the outer handle is laid down and the inner handle is rotated to be erected.

14. The luggage board apparatus for a vehicle of claim 2, wherein the operating handle is installed to be positioned at an intermediate point dividing a length in the left and right directions of the rear board while being positioned at a front side of the rear board, and the front roller and the rear roller, the roller wire, the front board block, the holding mechanism, the cable, the guide rail, and the guide rollers are symmetrically installed centering on the operating handle.

* * * * *